Figure 1:
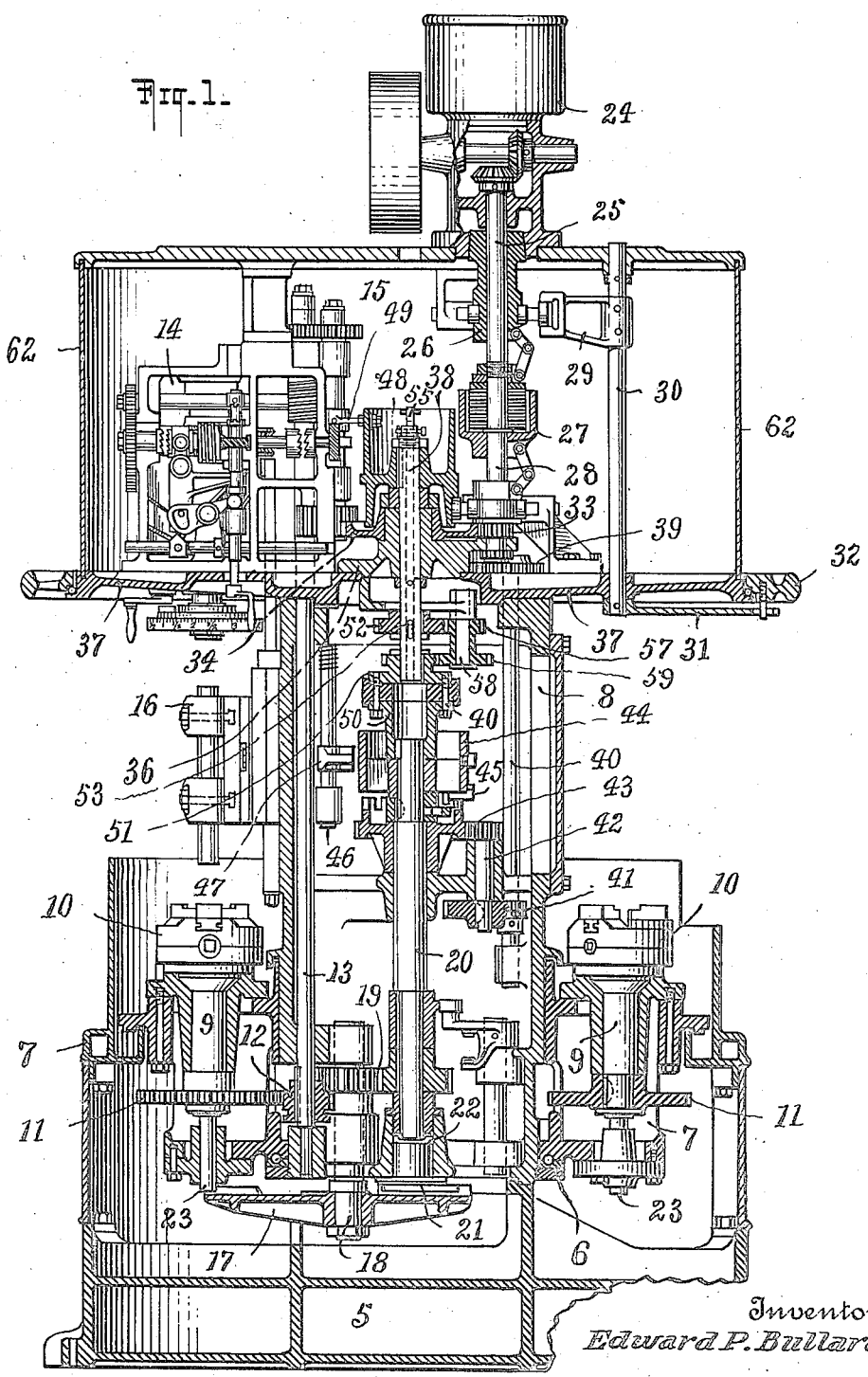

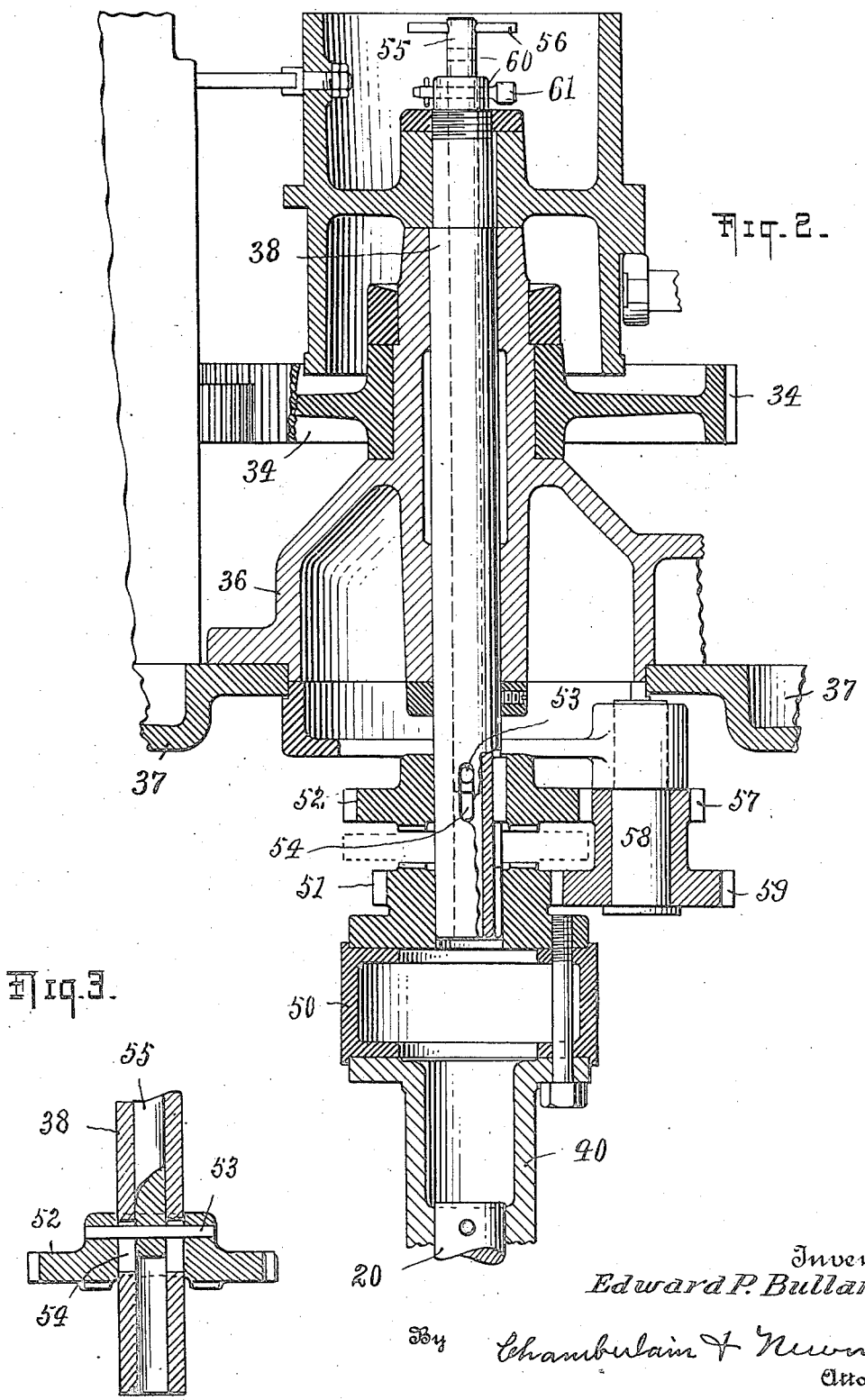

Patented May 15, 1923.

1,455,282

UNITED STATES PATENT OFFICE.

EDWARD P. BULLARD, JR., OF BRIDGEPORT, CONNECTICUT, ASSIGNOR TO THE BULLARD MACHINE TOOL CO., OF BRIDGEPORT, CONNECTICUT, A CORPORATION OF CONNECTICUT.

INDEXING DEVICE.

Application filed April 30, 1920. Serial No. 377,910.

*To all whom it may concern:*

Be it known that I, EDWARD P. BULLARD, Jr., a citizen of the United States, and resident of Bridgeport, in the county of Fairfield and State of Connecticut, have invented certain new and useful Improvements in Indexing Devices, of which the following is a specification.

The present invention relates to a multiple spindle type of machine tool commercially known as a "Mult-Au-Matic" and particularly to that class of machine shown and described in my previous Patent #1,258,089 granted March 5, 1918.

This particular type of multiple spindle machine includes a rotatable carrier adapted to be successfully rotated for indexing the same with respect to the base and a series of cutting tools. The carrier is provided with a series of rotatable work carrying tables which are adapted to rotate the work carried thereon, when positioned beneath the cutting tools. By the movement of the carrier the work tables are successively moved forward from one station to another where certain operations upon the work are performed and whereby the finished pieces are finally brought back to the loading station where they are removed and replaced by others to be finished.

There are six rotatable work tables mounted in the carrier of this type of machine, as shown in the patent, and as now put upon the market, and the indexing mechanism is constructed to impart to the carrier, six rotary movements to completely turn the same to successively present the tables with work thereon, at the five different operative stations where one or more tools are employed to operate upon each piece.

The foregoing construction of machine and method of indexing is particularly well adapted for a class of work requiring a series of five or more distinct operations and in cases where but one operator is engaged in running the machine. I find, however, that the production on this machine can be very much increased on other classes of work where a fewer number of cuts are required by what I term "double indexing" and whereby the carrier is moved twice or one-third of a rotation to each operation of the work table and tool-heads instead of one-sixth of a turn. This increased carrying movements between operations allow two pieces of work to be brought forward, taken off and replaced with each operation of the carrier, with the result that the production of a single machine is practically doubled.

It is therefore the purpose of my present invention to improve upon this type of machine by providing means whereby the carrier may either be indexed in the old way of six movements to a rotation and operations at each stop, or whereby at the will of the operator it may be changed to "double-indexing," making two movements between operations, and three double movements to a complete rotation. This means that in one instance each table will move from one operating station to the next with each movement of the carrier, and each of the five cutting tools will operate upon the work mounted upon each of the five tables when moved and positioned under said cutting tools, whereas in the other case while the tools operate at every station the tables stop at every other station. I accomplish the above objects in a simple and practical manner and so that the accurate working qualities of the machine will not be impaired. A further feature of the invention is to provide means whereby the manipulation of the machine made necessary by the changing from single to double-indexing, and vice versa, may be accomplished in a comparatively short length of time and with little inconvenience to the operator.

To this and other ends, my invention resides and consists in tool indexing mechanism for a multiple spindle machine, together with other associated features and combinations of parts as will be hereinafter described and more particularly pointed out in the claims, and upon which Fig. 1 shows a vertical cross section through a multiple spindle machine tool of the Mult-Au-Matic type before mentioned and to which I have applied my novel mechanism for either single or double indexing.

Fig. 2 shows an enlarged vertical cross section of the novel parts of the machine shown in Fig. 1, whereby the carrier of the machine may be made to index single or double as stated, and Fig. 3 shows a detail vertical cross sectional view taken at a right angle to Fig. 2 better to illustrate the connection of the slip-gear with its operating rod.

Referring in detail to the characters of reference marked upon the drawings, 5 represents a base having an annular track 6 in which is formed a raceway to contain a series of balls which form bearings for the rotatable carrier 7 mounted to turn upon the base and around the column 8 which forms a central support for the mechanism including the tool slides and the feed-works mounted in the upper part of the machine.

The carrier comprises an annular frame in which is mounted a series of, preferably 6, vertical spindles 9 carrying the work-table 10 on their upper end, each provided with a gear 11 on their lower end portions, by means of which the tables are driven when the carrier is stationed at a position of rest. These spindles are each operated through separate slip-gears 12 mounted on the vertical shafts 13 connected with and driven by the respective feed works 14 contained within the upper enclosure 15 of the machine. The five sets of feed works also serve to operate the five tool slides 16 to which is imparted both vertical and horizontal movements to feed the cutters carried in the tool heads thereon, in a manner to operate upon the work chucked on the work-tables when rotatably positioned beneath the tool-slides.

In practice these work-tables are designed to rotate only when the carrier is at a position of rest and remains idle during the indexing operations which rotate the carrier to move the table from one work station to another.

This indexing operation of the carrier is performed in the present instance by an indexing arm 17 which is pivotedly hung upon a crank arm 18 journalled in the base and provided with gear connections 19 whereby the crank shaft and its indexing arm are operated from the central main shaft 20. The inner end of the indexing arm is guided in its reciprocatory movements by a shoe 21 that is pivotally mounted in a socket 22 formed beneath and in alignment with the said main shaft. The action therefore of the indexing arm, when the main shaft is operated, is to oscillate and swing out and forward to successively engage the projected lower ends 23 of the spindles 9 in a way to move the same together with the tables and carrier forward a predetermined distance.

The main shaft as well as the other operative parts of the machine may derive their power from the motor 24 positioned on the top of the machine, and geared in a manner not shown to operate the driving shaft 25 upon which the clutch member 26 is slidably mounted, or the shaft 25 may be driven through bevel gears, shaft and driving pulley shown mounted thereon. This upper clutch member is provided with operating means whereby it may be made to engage and disengage the lower clutch member 27 on the driven shaft 28 for the purpose of operating the machine. The operating means for these clutches include an arm 29 and a rocker shaft 30 having an outwardly extended arm 31 which is connected to be operated by an annular ring 32 adapted to slide backward and forward in a way to rock the shaft and slide the clutch member 26 up and down upon the driving shaft. The lower shaft 28 carries a gear 33 connected to operate the gear 34 and through it power is distributed to the series of five sets of feed works 14 mounted in the upper compartment of the machine. This large gear 34 is mounted upon the bearing 36 secured to the plate 37 secured upon the upper end portion of the column 8. This bearing 36 is provided with a central bore in which an upper central hollow shaft 38 is journalled in alignment with the before mentioned central shaft 20, that serves to operate the carrier, through the controller drum 48 and the feeding works as will again be referred to. The shaft 20 is driven from the shaft 28 through gear connections 39 with shaft 40, and gear connections 41 with shaft 42, geared to drive the gear clutch member 43 loose upon the shaft 20. The controller 44 splined to the shaft 20 is provided with clutch connections 45 for engagement with the member 43 so that the said controller 44 and the shaft may be made to turn with the driven member 43 as is desired for the purpose of indexing the carrier. Each set of feed-works includes a depending shaft 46 which is operated at certain intervals, and carries an arm 47 to engage lugs on the controller drum 44, in a way to engage and disengage the drum with the gear clutch member 43 so as to operatively engage and disengage with the shaft 20 for the purpose of operating the tables and tool-slides.

The two central shafts 38 and 20, as before stated are in alignment, positioned one above the other, and may be coupled directly together to operate as one, thereby indexing the carrier one-sixth of a turn with each complete turn of the shaft 20 or may be indirectly connected to make two turns of the lower shaft to one turn of the upper shaft, thereby causing the carrier to be moved twice, or one-third of a complete rotation, to each operation of the feed works. As before stated the feed-works, in addition to their other uses, controls the starting and stopping of the rotary movement of the lower shaft and its carrier.

In this respect it might be borne in mind that when the carrier comes to a position of rest and the work-tables begin to rotate, the several feed-works operate to simultaneously start all the feed slides down. The slides automatically return to their upper normal position when their individual operations are completed, and as the last slide comes up, it trips the feed-works and starts the indexing of the carrier through the shafts 46, the arm 47 and the controller member 44. When the indexing is completed the feed-works will again promptly start to feed all the tool-slides down simultaneously as above mentioned.

The operative connection for this last mentioned feeding movement of the feed-slides is made with the upper controller drum 48 mounted on the upper end of the shaft 38. Said controller drum carries a series of lugs, positioned to engage the arms 49 extended from the clutch mechanism of the feed-works, whereby the said clutches are engaged to start the feed-works, tool-slides and tables.

The particular form of driving connection employed for coupling the upper shaft 38 to the lower shaft 20, includes a coupling 50 pinned to the shaft 20, a clutch gear 51, a slidable clutch gear 52 keyed to and movably mounted upon the said upper shaft 38. A pin 53 secured in the slidable clutch gear 52 extends through the slots 54 in the hollow shaft so as to be carried therewith, yet it is free to move longitudinally thereon. This pin is further secured to an operating rod 55 slidably mounted in the hollow shaft 38 and is provided with a handle 56 upon its projected upper end whereby it may be engaged and moved longitudinally within the hollow shaft. By this means the clutch gear upon the hollow shaft may be made to engage the clutch face of the clutch gear 51 for direct driving as indicated by dotted lines in Fig. 2, or the gear may be engaged with the pinion 57 on the stud 58 for indirect operation. This pinion 57 is cut on one end of a sleeve that also includes a larger pinion 59 that meshes with the before-mentioned clutch gear 51. The size of the gear drive as shown in Fig. 2 is such as to insure the turning of the shafts, two to one, with respect to each other. The slidable clutch gear 52 is provided with a key that slides in a keyway of the shaft 38 so as to insure an operative connection irrespective of the pin before mentioned. The upper end of the slide rod 55 is provided with pin holes 60 to receive the pin 61 removably mounted in the upper end of the hollow shaft 38 and the slide rod so as to hold the slide rod and its gear 52 in either an upper or lower position. This handle portion of the slide rod is positioned in the chamber 15 of the machine, where it can readily be gotten at, by sliding back one of the several side plates 62 enclosing the said compartment. By this means the machine may be readily set for the purposes before mentioned namely for either single or double indexing, and may be accomplished with comparatively few additional parts which are well designed and constructed to insure perfect and reliable operations.

Having thus described my invention, what I claim and desire to secure by Letters Patent, is—

1. A multiple spindle machine, comprising a rotatable carrier, a series of rotary work tables mounted in the carrier, a series of tool heads positioned above the operative stations of the work tables, means for indexing the carrier to move the tables a given distance during a cycle of operation of the indexing means, means for operating the tool heads and work tables, and operative connections between said indexing means and said operating means for indexing the carrier and selective means whereby the indexing means is operated through one or a plurality of cycles to index the carrier through different distances with relation to each operation of the tool heads and tables.

2. A multiple spindle machine, comprising a rotatable carrier, a series of rotary work tables mounted in the carrier, a series of tool heads positioned above the operative stations of the work tables, means for indexing the carrier to move the tables from one series of work stations to another series, means for operating the tool heads and work tables, and an adjustable connection between said indexing means and operating means, whereby the indexing means may be operated once or a plurality of times with relation to each operation of the tool heads and tables.

3. A multiple spindle machine, comprising a rotatable carrier, means for indexing the carrier, a series of rotary work tables mounted in the carrier, a series of tool heads positioned above the operative stations for the work tables, means for operating the tool heads and tables, and selective devices for at different times operating said indexing means and said operating means at different relative speeds to move the carrier different predetermined distances with relation to each operation of the tool heads and tables.

4. A multiple spindle machine, comprising a rotatable carrier, a shaft for operating the indexing means, indexing means adapted to rotate the carrier a given distance, a series of rotary work tables mounted in the carrier, a series of tool heads positioned above the operative stations for the work tables, a shaft for operating the tool heads and tables, means for operating the two shafts, and means whereby the indexing shaft may be operated at different relative speeds for operating the indexing means once or a plurality of times with relation to each operation of the tool-heads and tables.

5. A multiple spindle machine, comprising a rotatable carrier, a series of rotary work tables mounted in the carrier, a series of tool-heads positioned above the operative stations of the work tables, indexing means adapted to rotate the carrier a given distance, a shaft for operating the indexing means, a shaft in alignment with the indexing shaft for operating the tool-heads and tables, means connecting the ends of the shafts to operate them at the same speed, and means for connecting the shafts to operate at different relative speeds for the purpose of moving the carrier greater distances between the operations of the tool-heads and tables.

6. A multiple spindle machine, comprising a rotatable carrier, a series of rotary work tables mounted in the carrier, a series of tool-heads positioned above the operative stations of the work tables, indexing means adapted to rotate the carrier a given distance, a shaft for operating the indexing means, a shaft in alignment with the indexing shaft for operating the tool-heads and tables, a clutch for directly connecting the shafts, and reducing gears through which one shaft is driven from the other at a different relative speed.

7. A multiple spindle machine, comprising a rotatable carrier, a series of rotary work tables mounted in the carrier, a series of tool-heads positioned above the operative stations of the work tables, indexing means adapted to rotate the carrier a given distance, a shaft in alignment with the carrier shaft for operating the tool-heads and tables, a shaft for operating the indexing means, a clutch for directly connecting the shafts, idle gears connected with a gear fixed to one of the shafts, and a slide gear upon the other shaft for connection with the idler gear.

8. A multiple spindle machine, comprising a rotatable carrier, a series of rotary work tables mounted in the carrier, a series of tool-heads positioned above the operative stations of the work tables, indexing means adapted to rotate the carrier a given distance, a shaft for operating the indexing means, a shaft in alignment with the carrier shaft for operating the tool-heads and tables, a clutch for connecting the two shafts, gears for connecting the two shafts to operate at a different relative speed, and a combined gear and clutch member slidably mounted on one shaft for making either of said connections.

Signed at Bridgeport, in the county of Fairfield and State of Connecticut, this 28th day of April, A. D. 1920.

EDWARD P. BULLARD, Jr.

Witnesses:
  F. J. LYNCH,
  JOHN E. COTTER.